(No Model.)
J. V. BERGEN.
FOUNTAIN ATTACHMENT FOR INKSTANDS.
No. 446,279. Patented Feb. 10, 1891.
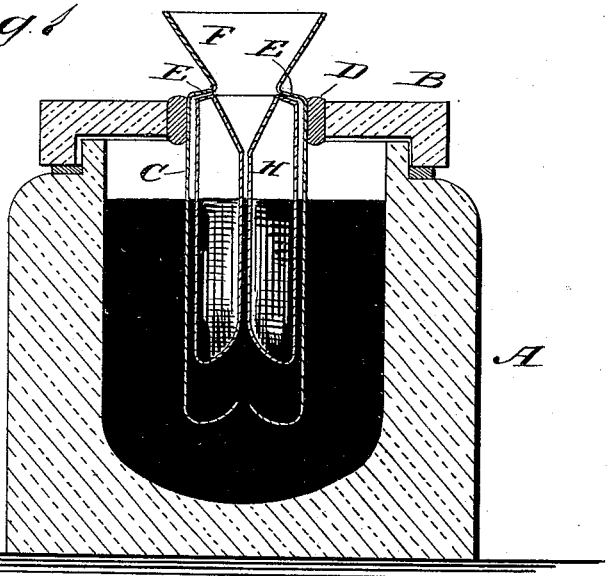
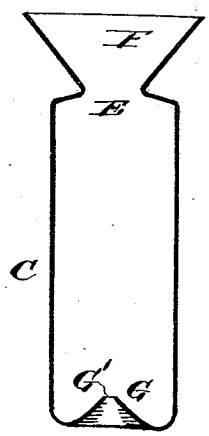
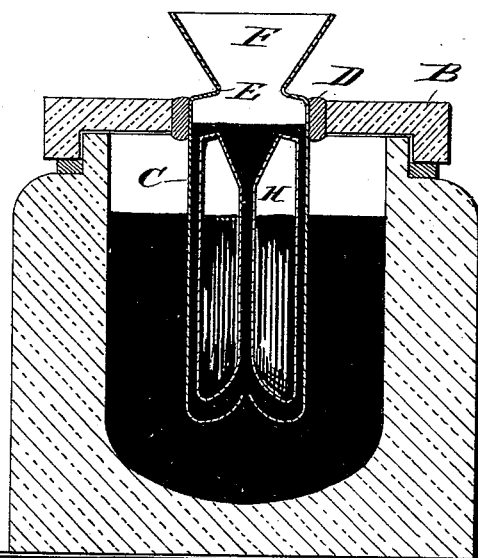
WITNESSES:
F. McArdle.
C. Sedgwick
INVENTOR:
J. V. Bergen
BY Munn & Co.
ATTORNEYS

UNITED STATES PATENT OFFICE.

JAMES V. BERGEN, OF AUSTIN, TEXAS.

FOUNTAIN ATTACHMENT FOR INKSTANDS.

SPECIFICATION forming part of Letters Patent No. 446,279, dated February 10, 1891.

Application filed October 10, 1890. Serial No. 367,674. (No model.)

*To all whom it may concern:*

Be it known that I, JAMES V. BERGEN, of Austin, in the county of Travis and State of Texas, have invented a new and Improved Fountain Attachment for Inkstands, of which the following is a full, clear, and exact description.

The object of my invention is to provide a new and improved fountain attachment for inkstands which is simple and durable in construction, excludes the air and dust from the ink, can be readily cleaned, is readily applied to the ink bottle, stands, and pots in use, and removable for purposes of filling, &c.

The invention consists of certain parts and details and combinations of the same, as will be hereinafter more fully described, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a similar view of the same in a different position. Fig. 3 is a sectional side elevation of the vessel, and Fig. 4 is a similar view of the float.

The improved fountain attachment is applied to a stand or pot A containing the ink and provided on top with a cover B, in the center of which is supported a vessel C, extending into the ink contained in the pot A. The vessel C preferably passes through a stopper D, held in the cover B, and the said vessel is provided at its upper end with a contracted neck E, from which extends upwardly and outwardly a funnel F.

In the inwardly-curved bottom G of the vessel C is formed a small aperture G', through which the ink from the pot A can slowly pass into the interior of the vessel C. In the latter is arranged a float H, adapted to be seated with its upper end against the contracted neck E of the vessel C. The float is somewhat less in diameter than the interior diameter of the vessel C, so that a space is formed between the wall of the float and the wall of the vessel C for the passage of the ink. The float H is also somewhat less in length than the vessel C and is provided with a central opening or channel I for upward flow of ink, and the base of float H is adapted to register with the bottom G of the vessel C.

The operation is as follows: When the pot A is filled with ink and the several parts are in the position as shown in Fig. 1, the ink from the pot can pass through the small aperture G' into the vessel C, and also rises in the channel I of the float H to the level of the ink in the pot A. The float H extends part way into the ink and is forced by the latter into an uppermost position, so that its upper end is seated against the contracted neck E, thus closing the vessel C at the funnel F to prevent the air from passing to the ink contained in the vessel. The surface of the ink only in the channel I is exposed to the atmosphere. When the operator desires to fill a pen with ink, he passes the pen through the funnel F against the funnel-shaped upper end of the channel I, so as to press the float H downward, whereby the ink in the vessel C rises above the float, as illustrated in Fig. 2, and the pen of the operator is filled with ink. As soon as the operator removes the pen from the float H the latter quickly rises and again seats itself with its upper end against the contracted neck E of the vessel C, thus closing the same. It is understood that the upper end of the channel I of the float H is so constructed as not to injure the point of the pen when the float is pressed downward. It is further understood that when the float is pressed downward by the pen the ink in the vessel cannot quickly escape back into the pot on account of the aperture G' being very small. Thus it will be seen that the ink is confined in an air and dust proof stand, which can be easily cleaned or filled whenever desired, the operator only removing the cover B, so as to get at all the parts.

Having thus fully described my invention, I claim as new and desire to secure by Letters Patent—

1. An attachment for inkstands, comprising the tubular vessel C, having an integral bottom G, provided with a small aperture G', the upper end of the vessel being contracted, as at E, and terminating in the integral funnel F, and the hollow float H, held within the vessel and of greater diameter than said contracted portion E and having a central vertical opening I, substantially as set forth.

2. An inkstand comprising the stand A, the centrally-apertured cover B, the flexible ring D in said aperture, the vessel C, held by said ring, provided with small aperture G', contracted neck E, funnel F above said ring, and the hollow float H, having a central vertical aperture, substantially as set forth.

JAMES V. BERGEN.

Witnesses:
JOHN K. DONNAN,
CHARLES W. DANIEL.